Figure 1:
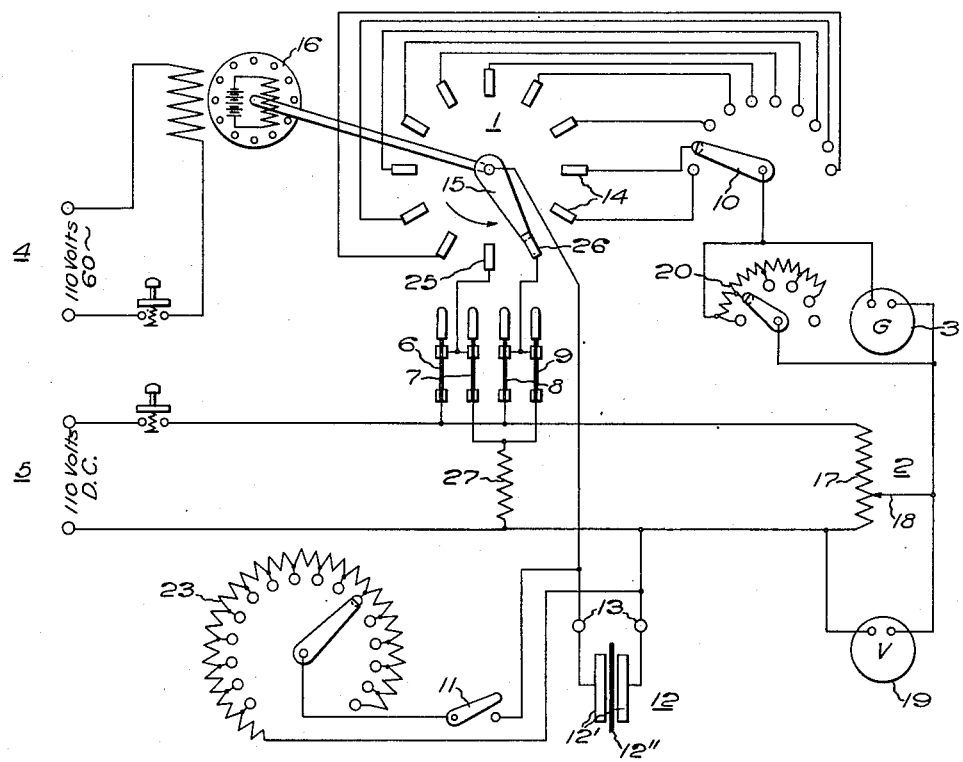

Dec. 13, 1927.

R. E. MARBURY 1,652,538

TESTING APPARATUS

Filed Aug. 28, 1925

WITNESSES:
G. S. Neilson
E. R. Evans

INVENTOR
Ralph E. Marbury.
BY
Wesley G. Carr
ATTORNEY

Patented Dec. 13, 1927.

1,652,538

UNITED STATES PATENT OFFICE.

RALPH E. MARBURY, OF WILKINSBURG, PENNSYLVANIA, ASSIGNOR TO WESTINGHOUSE ELECTRIC & MANUFACTURING COMPANY, A CORPORATION OF PENNSYLVANIA.

TESTING APPARATUS.

Application filed August 28, 1925. Serial No. 53,068.

My invention relates to a method and apparatus for testing the insulation of condensers, electrical windings, cables and the like.

An object of my invention is to provide a method and apparatus for measuring the residual potentials on condensers and the like after the same have been charged and completely or partially discharged, including the values obtaining within a fraction of a second after the discharge before the potential has reached a steady value.

A further object of my invention is to provide a method and apparatus for periodically charging and discharging a condenser and for periodically measuring the residual potential by comparison with a known potential in order to avoid the error caused by adding energy to, or abstracting energy from, the condenser. The recurrence of the phenomena facilitates the manual adjustment of the auxiliary or known potential to correspond with the condenser potential.

Certain features of my invention are not limited to insulation testing but may be used in evaluating various recurrent electrical phenomena. However, I consider that it is particularly adapted to the testing of insulation and, consequently, I shall describe its application to this subject in detail.

The quality of insulation is especially important where it is operated with maximum economy, as in the case of condensers and cables. In such apparatus, the insulation is the vital element and the cost depends upon the cost of the insulation and the amount of insulation required.

Improved methods of testing insulation not only leads to improved quality of the material by increasing our knowledge of the effects of different constituents and the treatment thereof but also permits the use of the insulation at a higher working stress without sacrificing reliability, because of the greater uniformity of the material. This is especially true of artificial insulation, such as fibrous materials impregnated with oils, waxes or similar substances. Such insulation, while of a complicated nature, may be controlled by carefully studying and regulating the quality of the constituent substances and the process of combination, whereas natural insulation, such as mica, can only be tested for quality.

It has long been recognized that non-homogeneous insulation is unequally stressed when subjected to an electrical potential and, in the case of artificial insulation, the non-homogeneity is usually an indication of a defect. In other words, if the product of the specific resistance R and the specific inductive capacity C is not substantially constant throughout the mass of insulation, the entire volume of insulation is not of satisfactory quality and cannot be used economically.

In the case of oil-impregnated paper insulation, for example, the electrical quality and the thermal radiating or conduction capacity depends upon the completeness of the impregnation and the absence of foreign matter or impurities, as well as upon the quality of the oil and paper. For instance, it is extremely important that all of the moisture be removed from the paper before the introduction of the oil and elaborate vacuum-treating ovens have been devised for this purpose.

The usual practice in testing insulation has been to test the finished condenser, cable or other device for the total dielectric losses. Such tests give the overall efficiency and temperature rise at the frequency of the test potential used but do not segregate the losses in the metal plates or wires, the conduction losses in the insulation and the so-called insulation hysteresis losses.

I have found that the losses in the insulation and the uniformity of the product RC throughout the mass of insulation are directly related to the phenomenon of absorption. In accordance with my invention, a study of the residual potentials immediately after discharging the condenser is made in order to determine the absorption characteristics of the insulation. The data thus obtained afford considerable information with respect to the amount of insulation losses and the uniformity of the insulation.

The obvious results from such refined methods of testing are the improved quality and uniformity of the product already intimated. A condenser with a defect of slight extent may have a relatively small total loss but would appear defective from this test, whereas a condenser without such defect might have the same total loss but would be of satisfactory quality, as indicated by this test. Furthermore, a condenser which has relatively large losses at high frequency may be satisfactory for low-frequency service if the dielectric losses are low. The absorption phenomena show the magnitude of the dielectric losses.

The method which I have devised may be used during the manufacture of oil-impregnated condensers to indicate the completion of the impregnating process and thereby improve the efficiency and speed of the process. It may also be used to test cables and the like in service to detect the deterioration of the insulation which sometimes occurs, as such deterioration changes the absorption characteristics as the product RC in the faulty portion of the insulation changes. Inasmuch as the deterioration of insulation ordinarily occurs in localized spots where slight defects exist or the stress is a maximum, the ordinary tests for total losses are of little value.

Figure 2:
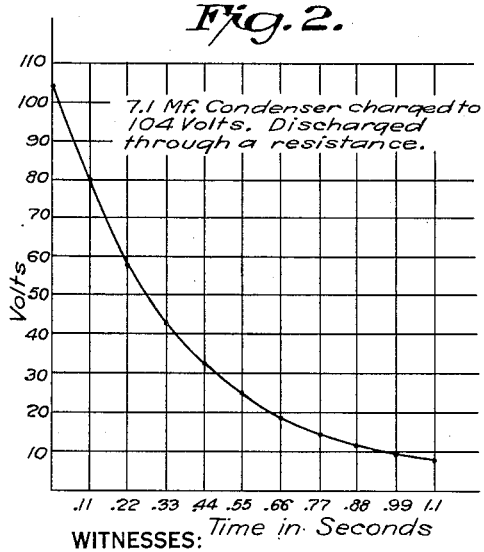
Figure 3:
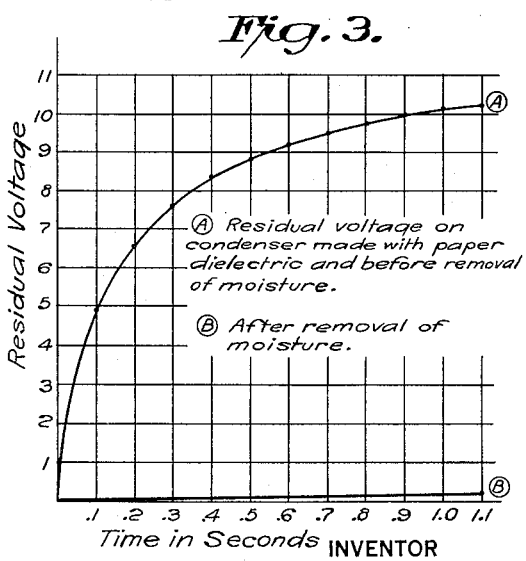

For a better understanding of my invention, reference should be had to the accompanying drawing, in which Fig. 1 is a diagrammatic view of the apparatus for practicing my invention, and Figs. 2 and 3 are diagrams showing typical curves obtained with the apparatus shown in Fig. 1.

The apparatus shown in Fig. 1 comprises a commutator device 1, a potentiometer 2, a galvanometer 3, sources of alternating and direct current 4 and 5, and control switches 6 to 11, inclusive. The condenser or device 12 to be tested is connected to the terminals 13, one of which is connected to the direct-current source 5. A typical form of condenser is shown comprising two conducting plates 12' separated by a mass of insulation 12''.

The commutator device 1 comprises a series of stationary contact segments 14 and a movable contact member 15 that is driven by a synchronous motor 16 connected to the alternating-current source 4. One of the terminals 13 is connected to the movable contact member 15 of the commutator device.

The potentiometer 2 comprises a variable resistor 17 connected across the terminals of the direct-current source 5. The adjustable contact member 18 of the potentiometer is connected, through the galvanometer 3 and the switch 10, to any desired one of the series of stationary contact segments 14 of the commutator device. The potential applied to the commutator segments through the circuit traced above is indicated by a voltmeter 19. A variable resistor 20 is connected in shunt relation to the galvanometer 3 to vary the sensitivity thereof. A variable resistor 23 is connected through the switch 11 in shunt relation to the terminals 13. The resistor 23 preferably has a maximum value of several hundred thousand ohms resistance.

Two of the stationary contact segments 25 and 26 of the commutator device 1 are connected through the switches 6, 7, 8 and 9 to the respective terminals of the direct-current source 5. If the direction of rotation of the movable contact member 15 of the commutator device 1 is in a counter-clockwise direction, as indicated, the contact member 15 engages first the stationary contact segment 25 and then the stationary contact segment 26.

If the switches 6 and 9 are closed and the switches 7 and 8 are open, the condenser 12 is charged to the full potential of the direct-current source 5 when the moving contact member 15 engages the stationary contact segment 25, and the condenser is discharged when the moving contact segment 15 engages the stationary contact segment 26. A resistor 27 of relatively low resistance is connected in series with the discharge circuit to prevent arcing of the contacts of the commutator device 1.

If the switches 6 and 9 are open and the switches 7 and 8 are closed, the condenser 12 is discharged and then charged to the value of the direct-current source 5 before engagement is effected with any of the other stationary contact terminals 14. If the switch 11 is closed, the condenser 12 is continuously shunted by the resistor 23 for a purpose to be described later.

If a perfect condenser could be constructed, it would have no absorption. If, however, there is any absorption, a residual voltage, will appear after the condenser is charged and discharged, which depends upon the initial charging voltage, the length of charge and discharge and the amount of absorption or the quality and uniformity of the insulation.

The residual voltage builds up to a maximum value in a relatively short time after the condenser is open-circuited. The rate at which the residual voltage increases, as well as the maximum value of the residual voltage, depends upon the quality and uniformity of the insulation, and careful analysis of these characteristics provides an indication of the major factors that should be taken into consideration in testing a condenser or similar device.

It is important that the initial part of the residual curve be obtained because the residual voltage in the case of the average condenser reaches a maximum value in less than a second, and the residual curve is distorted, after a few seconds, by leakage current through the insulation. It is particularly important to determine the residual curve when the time of charging and discharging the condenser is only a fraction of a second, the voltage building up under these conditions in a time comparable to the charging time.

In order to obtain the residual curve of a condenser, the switches 6 and 9 are closed, the switches 7, 8 and 11 are opened and the switch 10 is adjusted to close the circuit of the first stationary contact segment 14. The rotation of the moving contact member 15 under the control of the constant-speed motor 16 charges the condenser 12 for a predetermined time and then discharges the condenser through the resistor 27.

The speed of rotation of the moving contact member 15 may be, for example, 50 or 60 revolutions per minute, and the width of the contact segments 25 and 26 is sufficient to insure that the condenser is completely charged and discharged, except for the absorption. The width and spacing of the stationary contact segments 25 and 26 and of the other contact segments may be altered as desired, or a number of different commutator devices 1 driven by the motor 16 may be employed.

In the testing apparatus actually built, the moving contact member 15 made one revolution in 1.11 seconds, and it was found that this period was sufficient to obtain a very important part of the residual curve.

The rotation of the moving contact member 15 closes a circuit through the stationary contact member 14 a predetermined interval of time after the condenser has been discharged through the contact segment 26. A potential is applied to the first contact member 14 from the potentiometer 2, which may or may not correspond to the residual potential of the condenser at this time. If the applied potential does not correspond to the residual potential, the galvanometer 3 will deflect in the one or the other direction, depending upon whether energy is added to, or abstracted from, the condenser 12.

The continuous rotation of the contact member 15 periodically charges and discharges the condenser 12 and connects the condenser to the potentiometer 2. Accordingly, the potentiometer 2 may be readily adjusted until the galvanometer 3 does not deflect, whereupon the voltmeter 19 indicates the residual voltage of the condenser 1 at the instant corresponding to the particular contact segment 14 which is connected to the galvanometer 3. When there is no deflection of the galvanometer 3, no energy is transferred to or from the condenser and the errors from this source are eliminated. The various contact segments 14 may be connected, one after the other, to the galvanometer to obtain the values of the residual potential during the entire revolution of the moving contact member 15. The time of each point upon the residual curve is obtained from the spacing of the contact segments 14 and the rate of speed of the moving contact member 15.

A typical curve obtained by the foregoing operation is shown in Fig. 3. The curve A indicates, both by the rate of increase of the residual voltage and by the maximum value of the residual voltage, that the condenser being tested has a relatively large absorption and is unsatisfactory. As a matter of fact, the curve shown was obtained with a paper condenser before the moisture had been removed from the dielectric. The curve B is the residual curve of the same condenser after the moisture had been removed from the dielectric and indicates clearly the changes in the characteristics of the insulation.

Another test that may be made with the apparatus shown in Fig. 1 is the decay of voltage across a condenser when shunted by a relatively high resistance. For this test, the switches 6 and 9 are opened and the switches 7, 8 and 11 are closed. The rotation of the moving contact member 15 first discharges and then charges the condenser 12 to the value of the direct-current source 5.

By manipulating the testing equipment, as described above, a curve similar to that shown in Fig. 2 is obtained, showing the rate of decay of the condenser voltage when charged to a predetermined value and then connected for a predetermined time in shunt relation to a relatively high resistance. This curve indicated also the absorption properties of the insulation and is of value in detecting faulty insulation or insulation that has deteriorated in service. The effect of the charging voltage or the shunt resistance upon the characteristic curves shown in Figs. 2 and 3 may be obtained by varying the voltage of the direct-current source 5 or the resistor 23.

The equation of the curve shown in Fig. 2 for a perfect condenser is $$E = E_o \times \epsilon - \frac{t}{RC}$$

where $E$ is the voltage at any time $t$, $E_o$ is the initial voltage, $R$ and $C$, the resistance and capacity of the condenser and $\epsilon = 2.718$.

If the condenser has absorption, the values of $E$ will be higher than those for a perfect condenser and the deviation of the test curve from that corresponding to a perfect condenser provides an indication of the amount of absorption in the condenser.

I do not consider that my invention is limited to the testing of insulation or any specific type of electrical device. For instance, the synchronous commutator device 1, the potentiometer 2 and the galvanometer 3 arranged substantially as shown in the drawing may be employed in evaluating any recurrent electrical phenomena, especially if it is desired that a null-method be used where, as in the present instance, a transfer of energy from the apparatus being tested introduces an error into the results. In testing condensers of low capacity, the galvanometer may be made sensitive to small differences of potential by the use of a thermionic amplifier. Accordingly, I do not desire that any limitations shall be imposed upon the scope of my invention, except as may be indicated in the appended claims.

I claim as my invention:

1. Testing apparatus for a condenser and the like comprising means for successively charging the condenser at a fixed voltage and alternately discharging the same, measuring means and means operating between the condenser and said measuring means for actuating the latter in accordance with values of residual voltage occurring at successive times on the initial part of the residual voltage curve.

2. Testing apparatus for a condenser and the like comprising means for charging the condenser at successively different voltage values and alternately discharging the same, measuring means and means operating between the condenser and said measuring means for actuating the latter to measure residual voltage values in accordance with, and in the order of occurrence, of the said charging voltages.

3. The method of testing the insulation of condensers and the like, which comprises the steps of subjecting the insulation to a known potential, discharging the same for a relatively short period of time and balancing the residual potential after the lapse of a predetermined interval of time against a known potential.

4. The method of testing the insulation of condensers and the like, which comprises the steps of subjecting the insulation to a transient electrical condition that is affected by the character of the insulation and balancing the values of the potentials which exist during said transient condition against a known potential at intervals.

5. Testing apparatus for a condenser and the like comprising means for successively discharging the condenser and alternately charging the same, an adjustable impedance device for connection in shunt relation to the condenser and means for measuring voltage values in the condenser corresponding to different adjustments of said device.

6. Testing apparatus for condensers and the like comprising a stationary contact segment, a constant-speed moving contact member cooperating therewith and connected to the condenser, means for applying potential to the condenser through said segment and means for detecting any transfer of energy accompanying said application of potential.

7. Testing apparatus for condensers and the like comprising a series of stationary contact segments, a constant-speed moving contact member cooperating therewith and connected to the condenser, means for applying potential to said condenser through any one of a plurality of said segments, and means for detecting any transfer of energy accompanying said application of potential.

8. Testing apparatus for a condenser or the like comprising means for charging and discharging said condenser, means including a potentiometer for applying a predetermined potential to the condenser after the lapse of a predetermined period of time and a galvanometer so connected to the condenser as to indicate any transfer of energy accompanying said application of potential.

9. Testing apparatus for a condenser and the like comprising means for effecting circuit making and breaking operations, means for applying potential between the condenser and said first means, and means for balancing residual potential in the condenser against a known potential.

10. Testing apparatus for condensers and the like comprising means for charging and discharging the condenser, a galvanometer, a source of potential and means for connecting said galvanometer in series with said condenser and said source a predetermined time interval after said condenser has been discharged.

11. Testing apparatus for condensers and the like comprising means for charging and discharging the condenser periodically, a galvanometer, a variable source of potential and means for periodically connecting said galvanometer in series with said condenser and said source a predetermined time interval after said condenser has been discharged.

12. Testing apparatus for condensers and the like comprising a commutator device associated with the condenser, a constant-speed motor driving said commutator device, means including said commutator device for periodically charging and discharging said condenser, and means associated with said commutator device for measuring the residual potentials on said condenser at predetermined intervals after the charging or discharging thereof.

In testimony whereof, I have hereunto subscribed my name this 6th day of August, 1925.

RALPH E. MARBURY.